US012136171B2

(12) United States Patent
Kawakami

(10) Patent No.: US 12,136,171 B2
(45) Date of Patent: Nov. 5, 2024

(54) NON-TRANSITORY COMPUTER READABLE MEDIUM STORING PROGRAM TO GENERATE VIRTUAL SPACE, AND INFORMATION PROCESSING DEVICE AND METHOD TO GENERATE VIRTUAL SPACE

(71) Applicant: DWANGO Co., Ltd., Tokyo (JP)

(72) Inventor: Nobuo Kawakami, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 130 days.

(21) Appl. No.: 17/762,613

(22) PCT Filed: Oct. 19, 2020

(86) PCT No.: PCT/JP2020/039218
§ 371 (c)(1),
(2) Date: Mar. 22, 2022

(87) PCT Pub. No.: WO2021/131266
PCT Pub. Date: Jul. 1, 2021

(65) Prior Publication Data
US 2022/0343604 A1  Oct. 27, 2022

(30) Foreign Application Priority Data
Dec. 26, 2019  (JP) .................. 2019-237325

(51) Int. Cl.
*G06T 19/00* (2011.01)
*G06F 3/01* (2006.01)
(Continued)

(52) U.S. Cl.
CPC ............ *G06T 19/003* (2013.01); *G06F 3/011* (2013.01); *G06T 19/006* (2013.01); *G09B 5/02* (2013.01); *G09B 5/125* (2013.01)

(58) Field of Classification Search
None
See application file for complete search history.

(56) References Cited

U.S. PATENT DOCUMENTS

2009/0325138 A1*  12/2009  Shuster ............... G09B 5/00
                                                    434/350
2016/0049003 A1*   2/2016  Shuster ............... A63F 13/355
                                                    386/230

(Continued)

FOREIGN PATENT DOCUMENTS

JP       2009145883 A     7/2009
JP       2009301477 A    12/2009
(Continued)

OTHER PUBLICATIONS

Alexandra Petrakou, "Interacting through Avatars: Virtual Worlds as a Context for Online Education", 2010, Computers & Education, 54(4):1020-1027 (Year: 2010).*

(Continued)

*Primary Examiner* — Michael J Cobb
(74) *Attorney, Agent, or Firm* — Dorsey & Whitney LLP

(57) ABSTRACT

Provided is a program executable in a computer for viewing content. The computer includes a processor and a memory. The program causes the processor to execute a first step of generating a virtual space in response to an operation by a first user to designate content and setting a virtual viewpoint corresponding to the first user in the virtual space, a second step of starting reproduction of the content designated in the virtual space, and a third step of arranging, in the virtual space, at least one of an object pre-associated with the content or a second object corresponding to a second user who has viewed the content in the past, When the first user views the content, the object pre-associated or the second object is arranged in the third step at a position not related to a position of the virtual viewpoint of the second user in the virtual space or a position of the object pre-associated, when the second user viewed the content.

19 Claims, 13 Drawing Sheets

(51) Int. Cl.
 *G09B 5/02* (2006.01)
 *G09B 5/12* (2006.01)

(56) References Cited

U.S. PATENT DOCUMENTS

| 2020/0368616 | A1* | 11/2020 | Delamont | H04N 13/239 |
| 2021/0349309 | A1* | 11/2021 | Kawano | G06F 3/011 |
| 2022/0180583 | A1* | 6/2022 | Saito | G10L 15/22 |
| 2024/0096227 | A1* | 3/2024 | Iwaki | G06F 13/00 |

FOREIGN PATENT DOCUMENTS

| JP | 2010066790 | | 3/2010 |
| JP | 2017021799 | A | 1/2017 |
| KR | 20110105516 | A | 9/2011 |
| WO | 2021131266 | A1 | 7/2021 |

OTHER PUBLICATIONS

Sharad Sharma; Wenhao Chen, "Multi-User VR Classroom with 3D Interaction and Real-Time Motion Detection," 2014, 2014 International Conference on Computational Science and Computational Intelligence, pp. 187-192 (Year: 2014).*

Tuncer Can, Irfan Simsek, "The Use of 3D Virtual Learning Environments in Training Foreign Language Pre-Service Teachers", 2015M Turkish Online Journal of Distance Education, 16(4):114-124, Article 9 (Year: 2015).*

Meng-Yun Liao et al. "Virtual Classmates: Embodying Historical Learners' Messages as Learning Companions in a VR Classroom through Comment Mapping", Mar. 2019, 2019 IEEE Conference on Virtual Reality and 3D User Interfaces (VR), pp. 163-171 (Year: 2019).*

Julian Chen, "The Crossroads of English Language Learners, Tasked-Based Instruction, and 3D Multi-User Virtual Learning in Second Life", 2016, Computers & Education, 102:152-171 (Year: 2016).*

International Search Report and Written Opinion (English translation only for ISR) mailed on Nov. 10, 2020 for International Application No. PCT/JP2020/039218.

[English Translation] Notice of First Review Opinion for Chinese Patent Application No. 202080063745.6 dated Aug. 19, 2023, pp. all.

* cited by examiner

FIG.4

STORAGE 102

LECTURE DATA 1021

| NAME | GRADE | VIEW COUNT | FORMAT |
|---|---|---|---|
| ENGLISH 001 | GRADE 7 | 300 TIMES | SLIDE WITH LECTURER AVATAR |
| HISTORY 005 | GRADE 11 | 200 TIMES | MOVING IMAGE WITHOUT LECTURER AVATAR |
| ... | ... | ... | ... |

USER INFORMATION DATA 1022

| USER ID | GRADE | SEX | REGION | VIEW COUNT |
|---|---|---|---|---|
| #1A2B3D | GRADE 7 | FEMALE | TOKYO | 2018/4/10 ENGLISH 001 ... |
| #4D5E6F | GRADE 11 | MALE | OSAKA | 2019/5/3 HISTORY 005 ... |
| ... | ... | ... | ... | ... |

FIG.5

| NAME OF LECTURE DATA | REPRODUCTION POSITION OF LECTURE DATA | ARRANGEMENT POSITION OF FIRST OBJECT | ARRANGEMENT POSITION OF SECOND OBJECT | ARRANGEMENT POSITION OF THIRD OBJECT |
|---|---|---|---|---|
| ENGLISH 001 | X10, Y10, Z10 | X11, Y11, Z11 | X12, Y12, Z12 | X13, Y13, Z13 |
| HISTORY 005 | X20, Y20, Z20 | X21, Y21, Z21 | X22, Y22, Z22 | — |
| ... | ... | ... | ... | ... |

FIG.8

STORAGE — 102

LECTURE DATA — 1021

| NAME | GRADE | VIEW COUNT | FORMAT |
|---|---|---|---|
| ENGLISH 001 | GRADE 7 | 300 TIMES | SLIDE WITH LECTURER AVATAR |
| HISTORY 005 | GRADE 11 | 200 TIMES | MOVING IMAGE WITHOUT LECTURER AVATAR |
| ... | ... | ... | ... |

USER INFORMATION DATA — 1023

| USER ID | GRADE | SEX | REGION | VIEW COUNT | INPUT DATA WHEN VIEWING |
|---|---|---|---|---|---|
| #1A2B3D | GRADE 7 | FEMALE | TOKYO | 2018/4/10 ENGLISH 001 ... | Hello! I am Jack. |
| #4D5E6F | GRADE 11 | MALE | OSAKA | 2019/5/3 HISTORY 005 ... | WOW! |
| ... | ... | ... | ... | ... | |

FIG.11

STORAGE /102

LECTURE DATA /1021

| NAME | GRADE | VIEW COUNT | FORMAT |
|---|---|---|---|
| ENGLISH 001 | GRADE 7 | 300 TIMES | SLIDE WITH LECTURER AVATAR |
| HISTORY 005 | GRADE 11 | 200 TIMES | MOVING IMAGE WITHOUT LECTURER AVATAR |
| ... | ... | ... | ... |

USER INFORMATION DATA /1024

| USER ID | GRADE | SEX | REGION | VIEW COUNT | FRIENDS | NOTABILITY |
|---|---|---|---|---|---|---|
| #1A2B3D | GRADE 7 | FEMALE | TOKYO | 2018/4/10 ENGLISH 001 ... | #4D5E6F | 10TH PLACE |
| #4D5E6F | GRADE 11 | MALE | OSAKA | 2019/5/3 HISTORY 005 ... | #1A2B3D | 3RD PLACE |
| ... | ... | ... | ... | ... | | |

US 12,136,171 B2

NON-TRANSITORY COMPUTER READABLE MEDIUM STORING PROGRAM TO GENERATE VIRTUAL SPACE, AND INFORMATION PROCESSING DEVICE AND METHOD TO GENERATE VIRTUAL SPACE

CROSS REFERENCE TO RELATED APPLICATION(S)

This application is a U.S. National Stage filing under 35 U.S.C. § 371 of PCT Application No. PCT/JP2020/039218, filed Oct. 19, 2020, which claims priority to Japanese Application No. 2019-237325, filed Dec. 26, 2019, which are incorporated herein by reference, in their entirety, for any purpose.

TECHNICAL FIELD

The present disclosure relates to a program, an information processing device, and a method for viewing content.

BACKGROUND ART

To date, there has been a proposal of reproducing educational content by using VR (Virtual Reality) technology. For example, Patent Document 1 discloses a learning system for lectures between a lecturer device and a student device, in which system data to be recorded is drawn in a three-dimensional virtual space.

CITATION LIST

Patent Document

PATENT DOCUMENT 1: Japanese Unexamined Patent Publication No. 2009-145883

SUMMARY OF THE INVENTION

Technical Problem

However, in a class by a communication system as disclosed in Patent Document 1, each student takes a lesson alone at an individual place and is not able to know the situations of the other students. Therefore, the student experiences little sense of actually participating in the class and cannot communicate with the other students who are taking the same class. This makes it difficult to keep the student motivated, and tends to make the student passive to the lesson.

In view of the above circumstance, it is an object of the present disclosure to provide a user viewing content in a virtual space with higher sensation of actual participation and make the user feel as if he/she is viewing the content together with the other users.

Solution to the Problem

According to one embodiment, a program executable in a computer for viewing content is provided. The computer includes a processor and a memory, and the program causes the processor to execute: a first step of generating a virtual space in response to an operation by a first user to designate content and setting a virtual viewpoint corresponding to the first user in the virtual space; a second step of starting reproduction of the content designated in the virtual space; and a third step of arranging, in the virtual space, at least one of an object pre-associated with the content or a second object corresponding to a second user who has viewed the content in the past. When the first user views the content, the object pre-associated or the second object is arranged in the third step at a position not related to a position of the virtual viewpoint of the second user in the virtual space or a position of the object pre-associated at the time when the second user viewed the content.

According to one embodiment, an information processing device for viewing content is provided. The information processing device includes a controller and a storage. The controller causes execution of: a first step of generating a virtual space in response to an operation by a first user to designate content and setting a virtual viewpoint corresponding to the first user in the virtual space; a second step of starting reproduction of the content designated in the virtual space; and a third step of arranging, in the virtual space, at least one of an object pre-associated with the content or a second object corresponding to a second user who has viewed the content in the past. When the first user views the content, the object pre-associated or the second object is arranged in the third step at a position not related to a position of the virtual viewpoint of the second user in the virtual space or a position of the object pre-associated at the time when the second user viewed the content.

According to one embodiment, a method implemented in a computer for viewing content is provided. The computer includes a processor and a memory. The method includes the processor executing: a first step of generating a virtual space in response to an operation by a first user to designate content and setting a virtual viewpoint corresponding to the first user in the virtual space; a second step of starting reproduction of the content designated in the virtual space; and a third step of arranging, in the virtual space, at least one of an object pre-associated with the content or a second object corresponding to a second user who has viewed the content in the past. When the first user views the content, the object pre-associated or the second object is arranged in the third step at a position not related to a position of the virtual viewpoint of the second user in the virtual space or a position of the object pre-associated at the time when the second user viewed the content.

Advantages of the Invention

With the above-described program, information processing device, and method for viewing content, it is possible to provide a user viewing content in a virtual space with higher sensation of actual participation and make the user feel as if he/she is viewing the content together with the other users, and to let the user view the content at a most suitable position in a virtual space.

BRIEF DESCRIPTION OF THE DRAWINGS

FIG. 4 is a diagram showing an exemplary structure of data stored in the content distribution server according to the first embodiment of the present disclosure.

FIG. 5 is a diagram showing distribution control information at a time of distributing content, according to the first embodiment of the present disclosure.

FIG. 8 is a diagram showing an exemplary structure of data stored in the content distribution server according to a second embodiment of the present disclosure.

FIG. 11 is a diagram showing an exemplary structure of data stored in the content distribution server according to a third embodiment of the present disclosure.

DESCRIPTION OF EMBODIMENT

Figure 1:
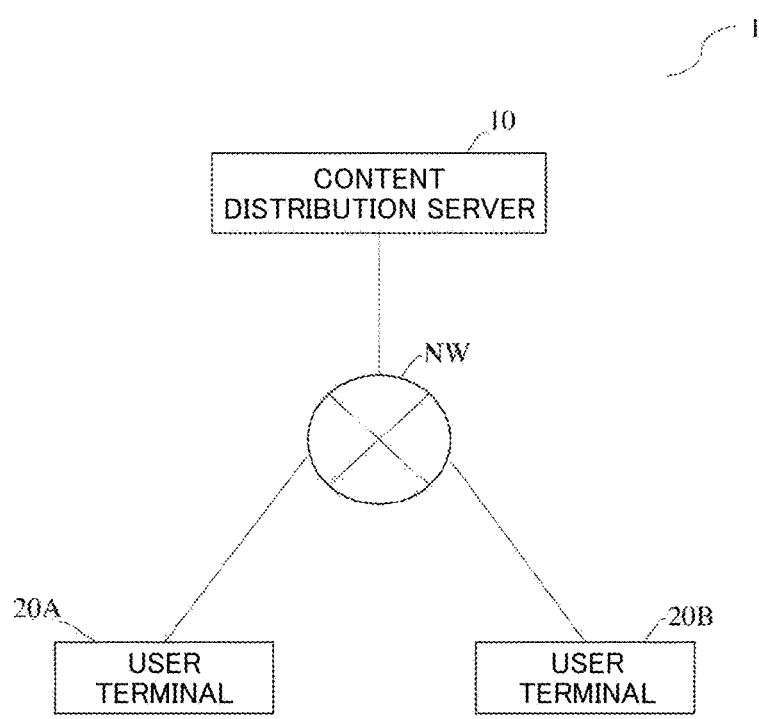
FIG. 1 is a diagram showing an overall configuration of a content viewing system 1 according to a first embodiment of the present disclosure.

In the following, embodiments of the present disclosure will be described with reference to the drawings. In the following description, the same components are denoted by the same reference characters. The names and functions for such components are also the same, and descriptions of these components are not repeated.

First Embodiment

The following describes a content viewing system 1, according to a first embodiment of the present disclosure, configured so that, when a user views educational content by using VR technology, an object corresponding to another user having viewed the content is arranged in the virtual space.

<1 Configuration of Content Viewing System>

First, with reference to FIG. 1, a configuration and overview of a content viewing system 1 related to the present embodiment will be described.

The content viewing system 1 is a system for distributing content to user terminals. As illustrated in FIG. 1, the content viewing system 1 includes a content distribution server 10 and user terminals (although FIG. 1 shows a user terminal 20A and a user terminal 20B, these may also be collectively referred to as "user terminal 20" hereinbelow). The content distribution server 10 and the user terminal 20 are connected to and in communication with each other via a network NW such as the Internet. The communication line of the network NW may be wired or wireless.

The content distribution server 10 is a server device that distributes, to the user terminal 20, educational content designated by a user. Specifically, the content distribution server 10 generates lecture data as content in a virtual space, and distributes the content generated to the user terminal 20 via the network NW. For example, the lecture data is images stored in the content distribution server 10. The details will be described later.

The user terminal 20 is an image display device, such as a head-mount device worn by the user, which displays content in a virtual space presenting a 360-degree view interlocking the content with the orientation of the user's face. Further, the user terminal 20 is a device connectable to the content distribution server 10 via the network NW such as the Internet. The details will be described later. The head mount device may be a so-called head-mount display having a display, or a head mount machine that allows mounting of a terminal having a display such as a smartphone.

<1.1 Configuration of Content Distribution Server>

Figure 2:
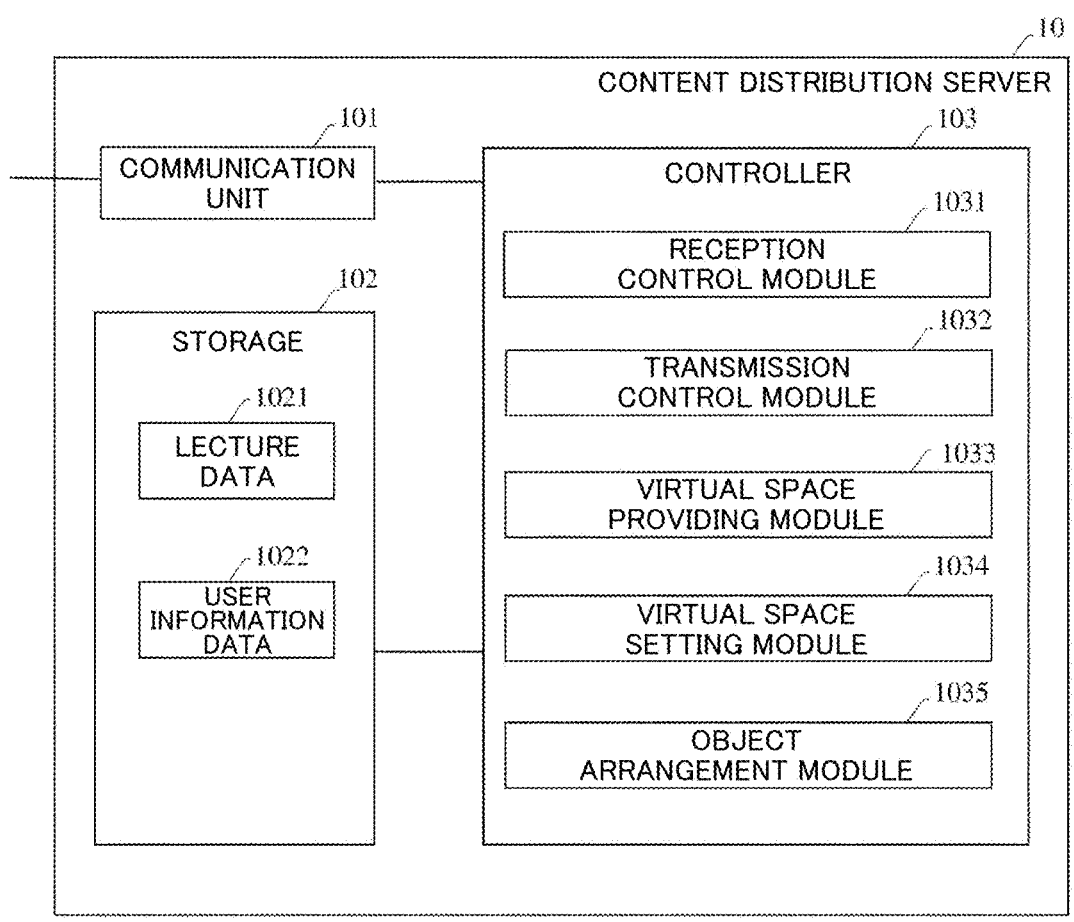
FIG. 2 is a diagram showing a configuration of a content distribution server according to the first embodiment of the present disclosure.

FIG. 2 is a diagram showing a functional configuration of the content distribution server 10. As shown in FIG. 2, the content distribution server 10 is a system for distributing content to a user terminal, and includes a communication unit 101, a storage 102, and a controller 103.

The communication unit 101 communicates with the user terminal 20 via the network NW. The communication unit 101 transmits a viewable content list and content designated by the user to the user terminal 20. Further, the user terminal 20 receives, from the user terminal 20, a viewing request signal of the user and a signal indicating an input operation while the user is viewing the content. Further, the communication unit 101 may receive as needed login ID information for the user to log in the content distribution server 10 from the user terminal 20.

The storage 102 stores data and a program for generating content, and more specifically, stores lecture data 1021 and user information data 1022. The lecture data 1021 is, for example, a database for storing images recorded in advance, and the user information data 1022 is a database for storing information of the user using the user terminal 20. The details will be described later.

The controller 103 generates content in the virtual space from data stored in the storage 102 in response to a viewing request transmitted from the user terminal 20, and distributes the content to the user terminal 20 via the communication unit 101 and the network NW. Specifically, the controller 103 functions as various modules by causing a processor of the content distribution server 10 to perform processes according to a program.

A reception control module 1031 controls a process of the content distribution server 10 receiving a signal from an external device according to a communication protocol. Specifically, the reception control module 1031 controls a process of receiving a user input from the user terminal 20. The user input includes designation of the content to be viewed, input of motion data and audio data when viewing the content, and the like.

A transmission control module 1032 controls a process of the content distribution server 10 transmitting a signal to an external device according to a communication protocol. Specifically, the transmission control module 1032 controls a process of transmitting a viewable content list to the user terminal 20 and a process of distributing content.

A virtual space providing module 1033 performs a process of specifying a virtual space for viewing content. The virtual space includes, for example, a background, an image of a menu selectable by the user, and the like. For example, the virtual space has a spherical configuration. In the virtual space, for example, a three-dimensional coordinate axes are defined, and the position of each object arranged in the virtual space is defined by a coordinate value in the XYZ-coordinate system defined in the virtual space.

In an aspect, an XYZ-coordinate system with its origin at the center is defined in the virtual space. The XYZ-coordinate system is parallel to, for example, a global coordinate system. Since the XYZ-coordinate system is a type of viewpoint coordinate system, the horizontal direction, orthogonal direction (upward-downward direction), and the front-rear direction in the XYZ-coordinate system are defined as an X-axis, a Y-axis, and a Z-axis, respectively. Therefore, the X-axis (horizontal direction) of the XYZ-coordinate system is parallel to the X-axis of the global coordinate system, the Y-axis (orthogonal direction) of the XYZ-coordinate system is parallel to the Y-axis of the global coordinate system, and the Z-axis (front-rear direction) of the XYZ-coordinate system is parallel to the Z-axis of the global coordinate system.

A virtual viewpoint setting module 1034 performs a process of setting a gazing point while the user views the content in the virtual space. A virtual viewpoint (also referred to as a virtual camera) is set using XYZ coordinate values of the virtual space. The user terminal 20 includes a motion sensor or the like to detect movement of the head of the user. For example, when the user wears the user terminal 20 as a head-mount display, the user terminal 20 detects the movement of the user terminal 20 as the movement of the user's head. In response to the movement of the head of the user, the field of view from the virtual viewpoint in the virtual space changes. This allows the user to view all directions of 360 degrees of the content in the virtual space from the virtual viewpoint.

An object arrangement module 1035 arranges three-dimensional objects constituting the content in the virtual space. In some embodiments, the objects include, for example, an object corresponding to a user having viewed the content in the past, an avatar object that provides a lecture in educational content, and an object corresponding to a user viewing the content. The arrangement positions of the objects are each defined by using the XYZ coordinate values of the virtual space.

<1.2 Configuration of User Terminal>

Figure 3:
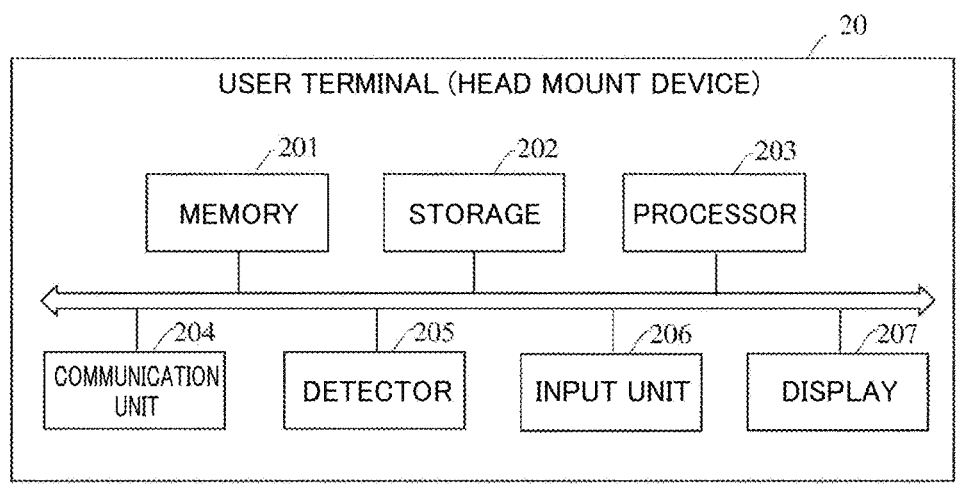
FIG. 3 is a diagram showing a configuration of a content viewing device according to the first embodiment of the present disclosure.

FIG. 3 is a diagram illustrating a functional configuration of the user terminal 20. As shown in FIG. 3, the user terminal 20 is a device for viewing the content in the virtual space, and includes a memory 201, a storage 202, a processor 203, a communication unit 204, a detector 205, an input unit 206, and a display 207. For example, the user terminal 20 is a head mount device worn on the head of a user, or the like.

The memory 201 is a volatile memory such as a dynamic random-access memory (DRAM) for temporarily storing a program, data processed by the program, and the like.

The storage 202 is a storage device, such as flash memory, hard disk (HDD), which is configured to store data.

The processor 203 is a piece of hardware for executing a set of commands coded in a program, and includes an arithmetic device, a register, a peripheral circuit, and the like.

The communication unit 204 communicates with the content distribution server 10 via the network NW. The communication unit 204 receives a viewable content list and content designated by the user from the content distribution server 10. Further, the communication unit 204 transmits, to the content distribution server 10, a viewing request signal of the user and an input signal while the user is viewing the content. Further, the communication unit 204 may transmit as needed login ID information for the user to log in the content distribution server 10 from the user terminal 20.

Note that the communication unit 204 may access the content distribution server 10 by dedicated application software installed, or may access the content distribution server 10 by using a separate operation environment (an application programming interface (API), a platform, or the like).

The detector 205 includes a gravity sensor, a gyro sensor, an acceleration sensor, and the like, and detects rotation, inclination, and vibration of the user terminal 20. Note that the detector 205 may be of another type of sensor as long as it is capable of detecting displacement of the user terminal.

The input unit 206 is an input device for receiving a user-input operation. The input operation includes designation of the content to be viewed, input of motion data and audio data at a time of viewing the content, and the like. For example, the input unit 206 may include a microphone for collecting user speech. Further, the user terminal 20 may be configured to communicate with a controller held by the user. For example, the controller held by a user's hand may include a motion sensor, a button, or the like, and the movement of the controller may be detected as the movement of the user's hand. For example, the user terminal 20 can obtain the motion of the controller as motion data by tracking the position of the controller held by the user.

The display 207 displays content distributed from a content distribution server 10. In one example, the display 207 is arranged in a main body of the user terminal 20 and positioned forward to both eyes of the user, and an image for the right eye and an image for the left eye are displayed on the display 207. When the eyes of the user visually recognize the respective images, the user can recognize the images as a three-dimensional image based on the parallax of the eyes and can immerse him/herself in the virtual space.

For example, the display 207 is implemented as a non-transmissive or transmissive display device, and an organic electroluminescence (organic EL), a liquid crystal display (LCD), or the like may be used. Further, a retinal projection type device may be adopted.

<2 Content>

With reference to FIG. 4 and FIG. 5, the following describes data constituting the content distributed from the content distribution server 10, according to the first embodiment of the present disclosure.

FIG. 4 is a diagram showing an exemplary structure of data stored in the content distribution server according to the first embodiment. The storage 102 of the content distribution server 10 stores the lecture data 1021 and the user information data 1022.

The lecture data 1021 is, for example, a database for storing images recorded in advance, and includes items "name", "grade", "view count", and "format", for example. Specifically, the item "name" is information indicating content of the lecture data, the item "grade" is a recommended user grade for taking the lecture data, the item "view count" is information indicating the number of times the lecture data has been viewed, and the item "format" is information indicating the display format of the lecture data. In one example, the lecture data named "English 001" includes slide data that can be reproduced in the virtual space and data related to a lecturer avatar that lectures while presenting the slide data to the user. The display format of the lecture data may be a moving image, and may not include the data related to the lecturer avatar.

The user information data 1022 is a database for storing information of the user who uses the user terminal 20, and includes, for example, items of "user ID", "grade", "sex", "region", and "view history". Specifically, the item "user ID" is information for identifying each user, the items "grade", "sex", and "region" are information indicating attributes of the user, and the item "view history" is information indicating the date and time of the user having viewed the content, the name of lecture data that the user has viewed, and the like.

FIG. 5 is a diagram showing distribution control information at a time of distributing content, according to the first embodiment. The content distribution server 10 generates the virtual space in which the XYZ-coordinate system is defined, after a viewing request from a first user is received. In this virtual space, the lecture data the user intends to view is arranged in a reproduction position indicated by first predetermined coordinates and reproduced.

Further, in the virtual space, the virtual viewpoint that is the gazing point of the first user viewing the lecture data is arranged in a viewing position indicated by second predetermined coordinates, according to the reproduction position of the lecture data. In an aspect, a first object (e.g., an avatar object) corresponding to the first user is arranged in the virtual viewpoint.

Further, in the virtual space, a second object (e.g., an avatar object) corresponding to a second user having viewed the lecture data in the past is arranged at a position indicated by third predetermined coordinates. Specifically, the arrangement position of the second object is a position that does not relate to the virtual viewpoint of the second user in the virtual space at the time of the second user viewing the lecture data. In an aspect, a third object that is a lecturer avatar is arranged at a position of the virtual space indicated by fourth predetermined coordinates. In an aspect, an object contained in the content (e.g., a student avatar to be a part of the content) is arranged in the virtual space, based on the position of the virtual viewpoint of the first user.

<3 Process Flow>

Figure 6:
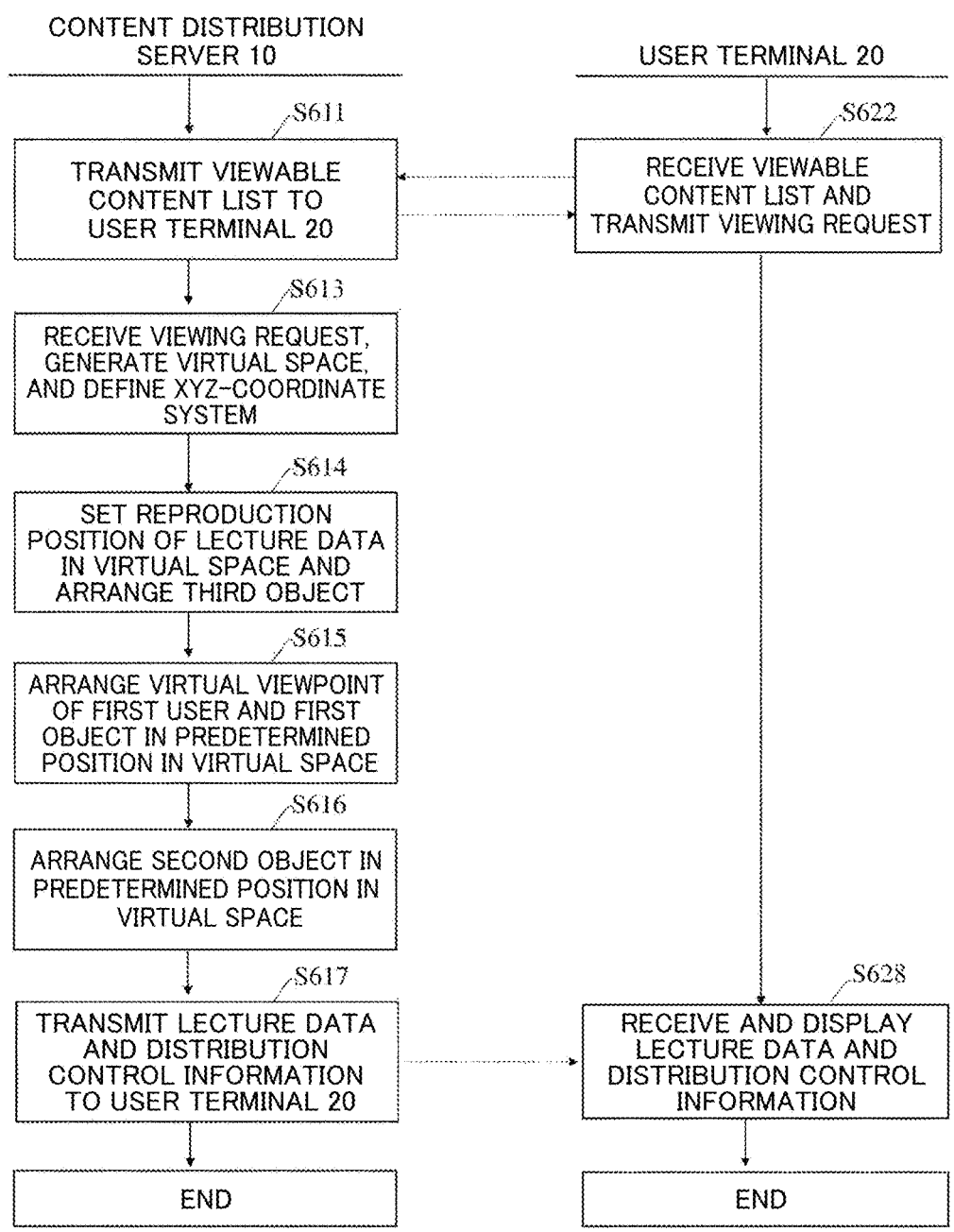
FIG. 6 is a flowchart showing an exemplary process flow of the content viewing system 1 according to the first embodiment of the present disclosure.
Figure 7:
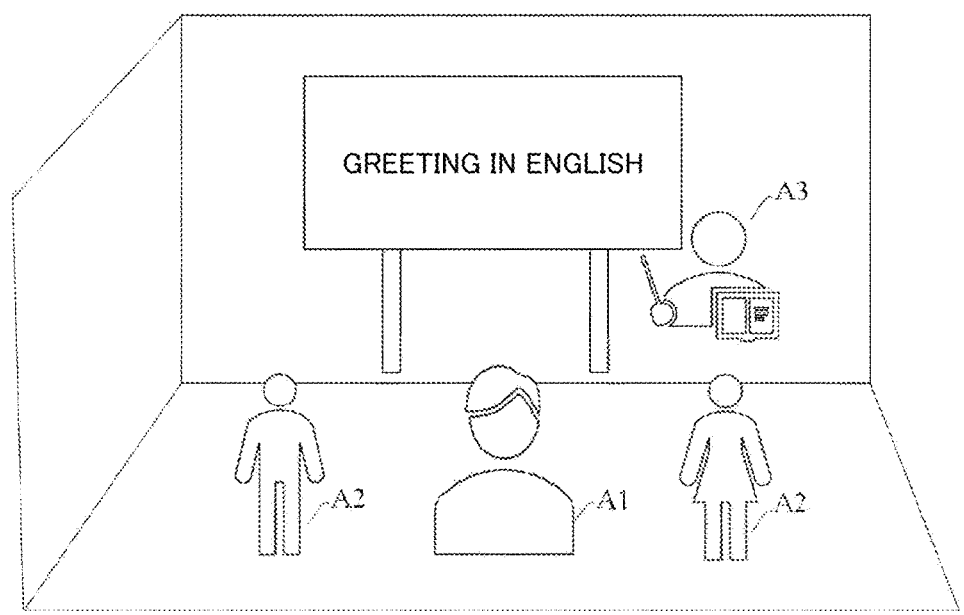
FIG. 7 is a diagram showing an exemplary display screen of a user terminal according to the first embodiment of the present invention.

The following describes, with reference to FIG. 6 and FIG. 7, an operation of the content distribution system 1 related to the first embodiment of the present disclosure. FIG. 6 is a flowchart showing an exemplary process flow of the content viewing system 1 according to the first embodiment. FIG. 7 is a diagram showing an exemplary display screen of a user terminal according to the first embodiment.

The flowchart of FIG. 6 shows how the operations of the content distribution server 10 and the user terminal 20 are related to each other. Although FIGS. 6 and 7 show the first object corresponding to the first user viewing the content and the third object as the lecturer avatar are arranged in the virtual space, these objects may not be arranged. Further, the description with reference to FIG. 6 deals with an example where the virtual space is generated in the content distribution server 10; however, the present disclosure is not limited to this. The virtual space may be generated in the user terminal 20, and the content distribution server 10 may transmit information of each object to the user terminal 20, instead of generating the virtual space.

In step S611, the content distribution server 10 transmits a viewable content list to the user terminal 20. The viewable content list is generated based on the lecture data stored in the storage 102 of the content distribution server 10.

In step S622, the user terminal 20 receives the viewable content list from the content distribution server 10, and the user designates the content to view and transmits a viewing request to the content distribution server 10.

In step S613, the content distribution server 10 receives the viewing request from the user terminal 20, generates the virtual space, and defines the XYZ-coordinate system of the virtual space. For example, the virtual space may include a background such as a classroom shown in FIG. 7.

In step S614, the content distribution server 10 sets the reproduction position of the lecture data in the virtual space and arranges the third object at a predetermined position. For example, as shown in FIG. 7, the third object is a lecturer avatar A3 who provides a lesson while presenting the lecture data to the user.

The lecture data is reproduced based on the reproduction position indicated by the first predetermined coordinates.

The lecture data may be, for example, moving image data. For example, an object such as a monitor or a board is arranged in a first reproduction position, and a moving image corresponding to the lecture data is reproduced in the object.

In addition, the lecture data may be data that defines a motion of the object and reproduction of the sound.

The reproduction position for presenting the lecture data to the first user may be a position where viewing from the virtual viewpoint of the first user is not blocked. For example, it is assumed that an initial position of the virtual viewpoint of the first user is defined in the virtual space generated. The reproduction position of the lecture data may be defined at a position forward to the initial position of the virtual viewpoint.

The arrangement position of the third object (i.e., the lecturer avatar) may be determined in advance according to the reproduction position of the lecture data. For example, when viewed from the virtual viewpoint of the first user, the third object is arranged near (on the right or left side of) the object in which the lecture data is reproduced. For example, when viewed from the virtual viewpoint of the first user, the third object may be arranged at a position so that viewing of the lecture data is not blocked at least within a predetermined range.

Further, the lecture data may include operating the third object. For example, the lecture data may be reproduced in the virtual space, by operating the third object based on at least one of motion data or audio data.

In step S615, the content distribution server 10 arranges, in a predetermined coordinate position, the virtual viewpoint that is the gazing point of the first user viewing the lecture data in the virtual space, and arranges a first object A1 corresponding to the first user based on the position of the virtual space, as shown in FIG. 7. For example, the first object A1 may be arranged in the position of the virtual viewpoint of the first user, or the position of the virtual viewpoint may be set to the rear of the first object A1 (so that the first object A1 is included in the field of view of the first user).

The arrangement position of the virtual viewpoint of the first user is determined in advance according to the reproduction position of the lecture data or the arrangement position of the third object A3. For example, the virtual viewpoint of the first user is arranged at a position so that viewing is not blocked by an object corresponding to another user. For example, the virtual view point of the first user may be arranged at a position facing near the center of a reproduction area of the lecture data, or at a position facing the front of the third object A3. This way, the user is able to take the lesson in a most suitable position for him/herself. That is, to simulate, in a lesson in a classroom of the virtual space, a relationship between a teacher and a student in a real world lesson, the virtual viewpoint of the student (first user) taking the lesson and an avatar (first object A1) corresponding the student are arranged in front of the object corresponding to the teacher (lecturer avatar). Alternatively, in the classroom of the virtual space, the virtual viewpoint of the student (first user) and the avatar (first object A1) corresponding to the student may be arranged in front of an object such as a blackboard or a display for causing the student to recognize the lesson content, instead of arranging them in front of the lecturer avatar. That is, it can be said that the virtual viewpoint and the avatar corresponding to a student who has viewed the content in the past are also arranged to face the front of the lecturer avatar or the object such as the blackboard or the display at the time while that student was viewing the content.

In step S616, the content distribution server 10 arranges, in the virtual space, a second object corresponding to a second user having viewed the lecture data in the past, at a position indicated by the third predetermined coordinates. The arrangement position of the second object is a position that does not relate to the virtual viewpoint of the second user in the virtual space at the time of the second user viewing the lecture data. For example, even if the second user has viewed the lecture data from the position of the virtual viewpoint of the first user, the second object is arranged at a position different from the virtual viewpoint when the first user views the lecture data.

The arrangement position of the second object is suitably set according to the reproduction position of the lecture data or the arrangement position of the virtual viewpoint of the first user (or the first object A1). For example, the second object A2 is arranged on both sides of the first object A1, as shown in FIG. 7. For example, a certain range including a line connecting the coordinates of the first reproduction position and the coordinates of the virtual viewpoint of the first user is set based on the first reproduction position of the lecture data and the position of the virtual viewpoint of the first user so as not to block the first user from viewing the lecture data. The second object A2 may be arranged outside the certain range. Further, to provide the first user with a sense of viewing the lecture data with another user, the second object may be arranged within a certain range from the position of the virtual viewpoint of the first user. This allows the first user to feel as if he/she is viewing the lecture data with another user, while enabling the first user to view the lecture data from a position suitable for viewing the lecture data without being excessively blocked by an avatar corresponding to the other user having viewed the lecture data in the past.

In step S617, the content distribution server 10 transmits the lecture data and the distribution control information to the user terminal 20. The distribution control information includes virtual space information, reproduction position information of the lecture data, and arrangement control information of first, second, and third objects.

In step S628, the user terminal 20 receives the lecture data and the distribution control information from the content distribution server 10 and displays the content.

In the above-described example shown in FIG. 6, the virtual space is generated and the objects are arranged in the content distribution server 10. However, the virtual space does not have to be generated in the content distribution server 10, and the virtual space may be generated and each object may be arranged in the user terminal 20.

The user terminal 20 may suitably control the motion of the object corresponding to the other user having viewed the lecture data in the past, irrespective of the motion of the other user. Further, the content distribution server 10 or the user terminal 20 may automatically generate the motion of the object corresponding to the other user, irrespective of the motion data and the audio data of the other user.

Further, the object corresponding to the other user may be operated based on the motion data or the audio data of the other user. For example, when the motion of the other user is large and the speaking volume is also large, the motion data of the other user may be reflected in the object corresponding to the other user.

<4 Effects>

As described above, with the content distribution system 1 according to the first embodiment of the present disclosure, when the first user views content in the virtual space, the second object corresponding to the second user having viewed the content is arranged in a predetermined position in the virtual space. Therefore, the system causes the first user to feel as if he/she is viewing the content together with the second user, and achieves a higher sense of reality.

Further, each user who views the content at a different timing from another user is always able to take the lesson at a suitable position for him/herself (i.e., in front of a lecturer avatar, or an object that causes the student to recognize the content of the lesson, such as a blackboard, display, or the like). It is possible to give lessons in an idealistic and highly effective form without failure.

Second Embodiment

The following describes a content viewing system 1, according to a second embodiment of the present disclosure, configured so that, when a user views educational content by using VR technology, an object corresponding to another user having viewed the content is arranged in the virtual space, and the object corresponding to the other user having viewed the content is operated. The second embodiment is described, using the content distribution system 1 of the first embodiment.

<1 Configuration of Content Viewing System>

Since the configurations of the content viewing system 1, the content distribution server 10, and the user terminal 20 of the second embodiment of the present disclosure are similar to those of the first embodiment, description of these configurations will not be repeated.

<2 Content>

With reference to FIGS. 8 and 5, the following describes data constituting the content distributed from the content distribution server 10, according to the second embodiment of the present disclosure.

FIG. 8 is a diagram showing an exemplary structure of data stored in the content distribution server according to the second embodiment. The storage 102 of the content distribution server 10 stores the lecture data 1021 and the user information data 1023.

The lecture data 1021 in the second embodiment is similar to that in the first embodiment, and the description thereof is not repeated.

In addition to the items of the user information data 1022 of the first embodiment, the user information data 1023 of the second embodiment contains an item "input data when viewing", that is, input data recorded while the user views the content. The input data is, for example, motion data and audio data of the user.

The user input data is data that may be read out when another user views the content in the future. Based on the motion data and audio data input by the user having viewed the content in the past, an object corresponding to that user is operated.

Since the distribution control information at the time of distributing the content in the second embodiment is the same as the distribution control information at the time of distributing the content in the first embodiment, the description thereof will not be repeated.

<3 Process Flow>

Figure 9:
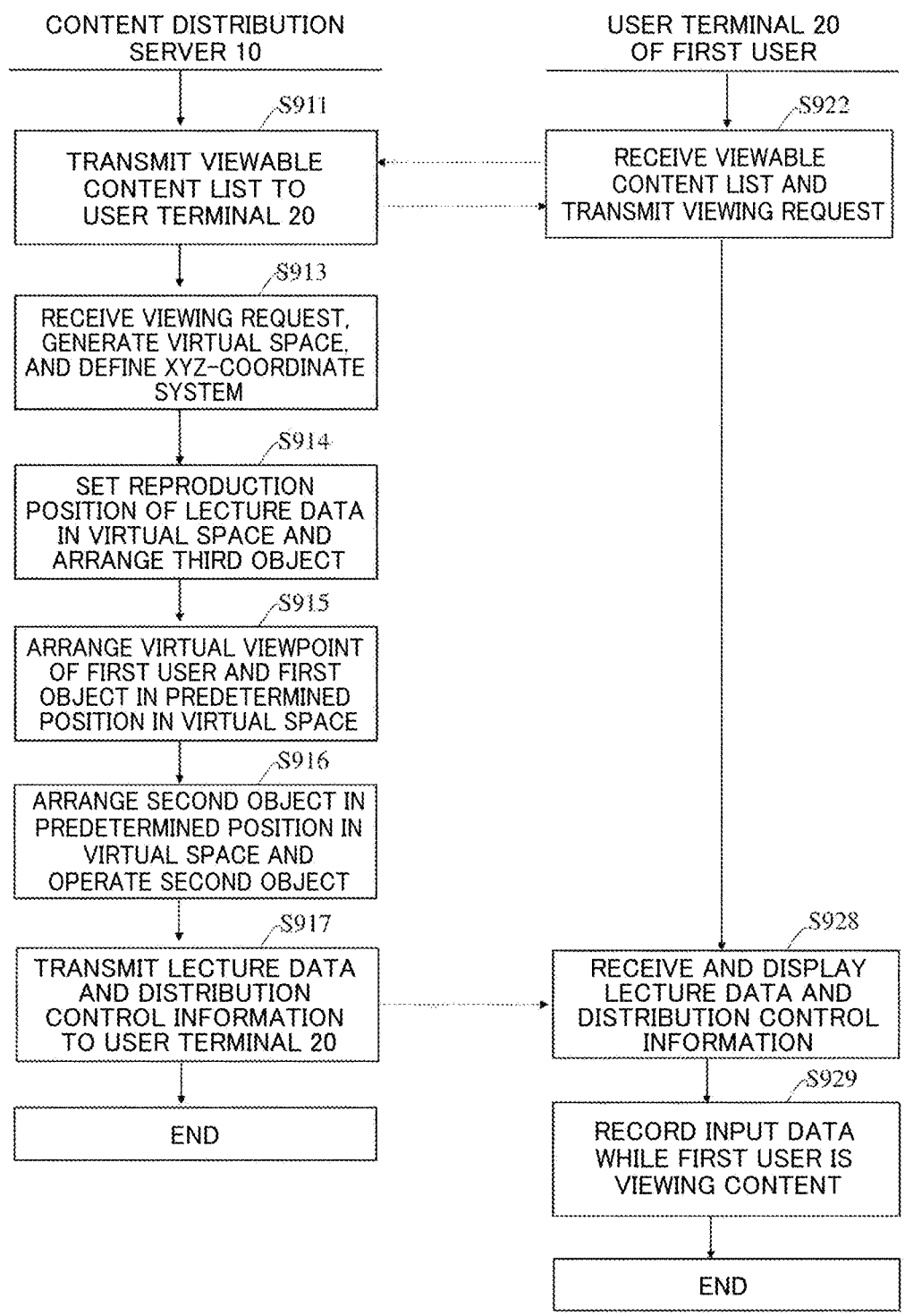
FIG. 9 is a flowchart showing an exemplary process flow of the content viewing system 1 according to the second embodiment of the present disclosure.
Figure 10:
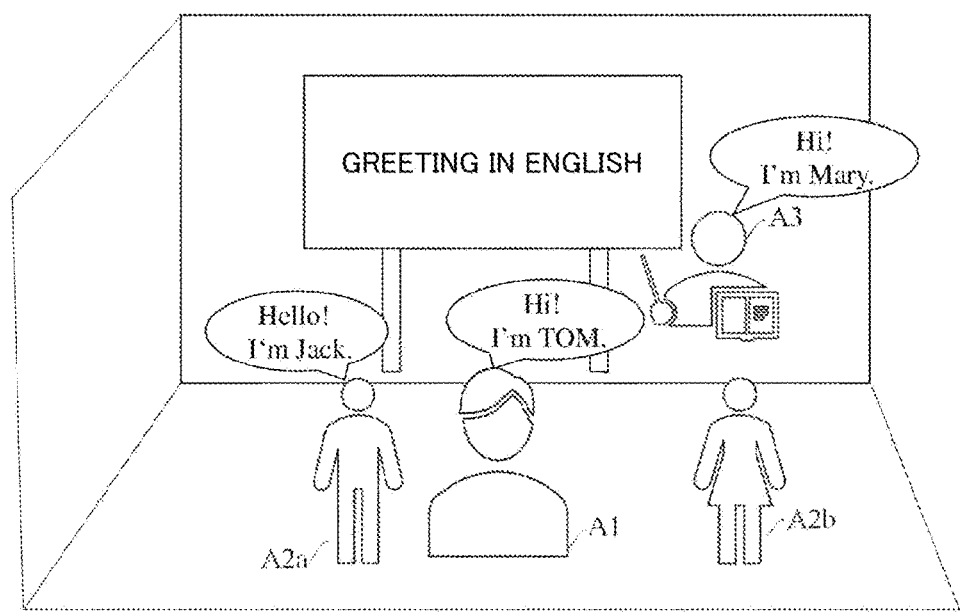
FIG. 10 is a diagram showing an exemplary screen displayed on a content viewing device according to the second embodiment of the present disclosure.

The following describes, with reference to FIGS. 9 and 10, an operation of the content distribution system 1 related to the second embodiment of the present disclosure. FIG. 9 is a flowchart showing an exemplary process flow of the content viewing system 1 according to the second embodiment. FIG. 10 is a diagram showing an exemplary display screen of a user terminal according to the second embodiment.

The flowchart of FIG. 9 shows how the operations of the content distribution server 10 and the user terminal 20 are related to each other. Although FIGS. 9 and 10 show the first object corresponding to the first user viewing the content and the third object as the lecturer avatar are arranged in the virtual space, these objects may not be arranged.

Since the operations of step S911 through step S915, and step S922 are the same as those of step S611 through step S615, and step S622 in the first embodiment, the description thereof will not be repeated.

In step S916, the content distribution server 10 arranges, in the virtual space, a second object corresponding to a second user having viewed the lecture data in the past, at a position indicated by the third predetermined coordinates, and operates the second object based on input data recorded at the time the second user has watched the content. The arrangement position of the second object is a position that does not relate to the virtual viewpoint of the second user in the virtual space at the time of the second user viewing the lecture data.

The arrangement position of the second object is suitably set according to the reproduction position of the lecture data or the arrangement position of the first object A1. For example, where a direction of viewing the lecture data from the position of the first object A1 (i.e., from the position of the virtual viewpoint of the first user) is forward, the second objects A2a and A2b are arranged on sides of the first object A1, as shown in FIG. 10.

The input data by the second user includes motion data and audio data input at the time the second user viewed the content. For example, if the second user input audio data "Hello! I'm Jack." at the time of viewing an English lecture, the second object A2a is arranged as shown in FIG. 10 when the first user views the lecture data and operated so as to speak "Hello! I'm Jack" that is recorded in the past.

In step S917, the content distribution server 10 transmits the lecture data and the distribution control information to the user terminal 20. The distribution control information includes virtual space information, reproduction position information of the lecture data, arrangement control information of first, second, and third objects, and motion information of the second object.

In step S928, the user terminal 20 receives the lecture data and the distribution control information from the content distribution server 10 and displays the content.

In step S929, input data while the first user is viewing the content is recorded.

In a preferred embodiment, at least one of motion data or audio data the second user has input in response to a motion of the third object (lecturer avatar) may be read out, and the third object may be operated based on at least one of the motion data or the audio data of the second user.

For example, as shown in FIG. 10, the third object A3 is operated based on the audio data "Hello! I'm Jack." input by the second user in response to the movement of the third object A3.

In a preferred embodiment, the second object may be operated based on at least one of the motion data or the audio data of the second user, in response to an input of at least one of motion data or audio data by the first user, while the first user is viewing the content. The at least one of motion data or the audio data of the second user to operate the second object is motion data or audio data recorded when the second user interacted with the third object A3 (lecturer avatar).

For example, suppose the second user has input audio data "Hello! I'm Jack" in response to a speech of the lecturer avatar A3 "Hi!, I'm Marry.", while the second user is viewing the content, as shown in FIG. 10. When the first user views the same content and input audio data "Hi! I'm TOM.", the second object A2a corresponding to the second user is operated to say "Hello! I'm Jack.", in response to the input by the first user.

Preferably, in step S916, a user out of a plurality of second users whose motion data or audio data satisfies a predetermined condition is specified, and a specific object specifying the user specified is arranged within a predetermined distance from the position of the virtual viewpoint of the first user. Further, the specific object may be operated based on at least the motion data or the audio data of the user specified.

For example, as shown in FIG. 10, the second object A2a corresponding to the second user who has input audio data is arranged closer to the first object A1 corresponding to the first user, as compared to the second object A2b corresponding to the second user who did not input audio data. Further, the second object A2a is operated by the audio data "Hello! I'm Jack." input by the second user.

In a preferred embodiment, at least one of motion data or audio data the second user has input in response to a motion of the third object (lecturer avatar) may be read out, and the first object may be operated based on at least one of the motion data or the audio data of the second user.

For example, although illustration is omitted, the first object A1 may be operated based on the audio data "Hello! I'm Jack." input by the second user in response to the movement of the third object A3. For example, if the content is such that the lecturer avatar (third object A3) and the student avatars (second object A2a, first object A1, and the like) read aloud fixed dialogue, the second user viewing the content may read aloud the dialogue after the lecturer avatar in place of the student having viewed the content in the past, instead of the second user simply viewing the avatar of the student having viewed the content in the past reading aloud.

<4 Effects>

As described above, with the content distribution system 1 according to the second embodiment of the present disclosure, when the first user views content in the virtual space, the second object corresponding to the second user having viewed the content is arranged in a predetermined position in the virtual space. Therefore, the system causes the first user to feel as if he/she is viewing the content together with the second user, and achieves a higher sense of reality. Further, the second object is operated based on the motion data or audio data input at the time the second user was viewing the content. Therefore, it is possible to construct two-way communication between the first user and the second user.

Third Embodiment

The following describes a content viewing system 1, according to a third embodiment of the present disclosure, configured so that, when a user views educational content by using VR technology, an object corresponding to another user having viewed the content is arranged in the virtual space according to an attribute of the other user. The third embodiment is described, using the content distribution system 1 of the first embodiment.

<1 Configuration of Content Viewing System>

Since the configurations of the content viewing system 1, the content distribution server 10, and the user terminal 20 of the third embodiment of the present disclosure are similar to those of the first embodiment, description of these configurations will not be repeated.

<2 Content>

With reference to FIG. 11 and FIG. 5, the following describes data constituting the content distributed from the content distribution server 10, according to the third embodiment of the present disclosure.

FIG. 11 is a diagram showing an exemplary structure of data stored in the content distribution server according to the third embodiment. The storage 102 of the content distribution server 10 stores the lecture data 1021 and the user information data 1024.

The lecture data 1021 in the third embodiment is similar to that in the first embodiment, and the description thereof is not repeated.

In addition to the items of the user information data 1022 of the first embodiment, the user information data 1024 of the third embodiment contains an item "friends", that is, ID information of other users friend-registered, and an item "notability", that is, notability information of the user. The notability information is, for example, ranking of how many times the user is friend-registered to the other users. The higher the number of times the user is friend-registered, the higher the popularity of the user is.

Since the distribution control at the time of distributing the content in the third embodiment is the same as the distribution control at the time of distributing the content in the first embodiment, the description thereof will not be repeated.

<3 Process Flow>

Figure 12:
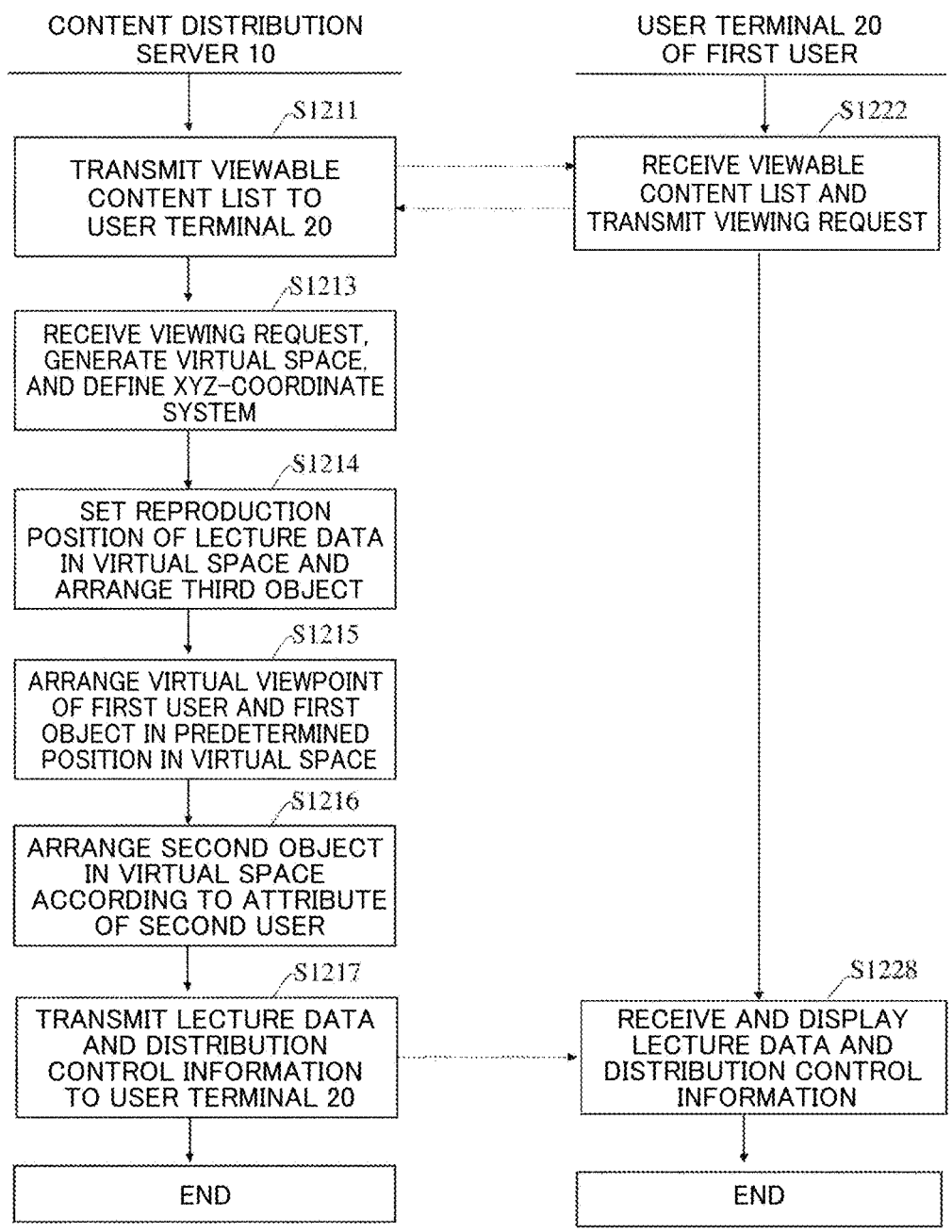
FIG. 12 is a flowchart showing an exemplary process flow of the content viewing system 1 according to the third embodiment of the present disclosure.
Figure 13:
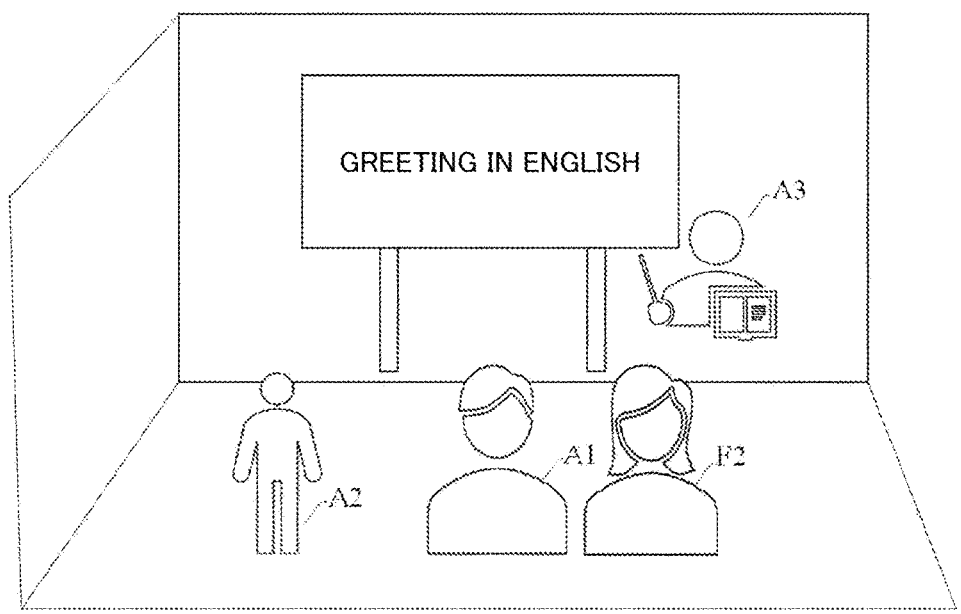
FIG. 13 is a diagram showing an exemplary screen displayed on a content viewing device according to the third embodiment of the present disclosure.

The following describes, with reference to FIGS. 12 and 13, an operation of the content distribution system 1 related to the third embodiment of the present disclosure. FIG. 12 is a flowchart showing an exemplary process flow of the content viewing system 1 according to the third embodiment. FIG. 13 is a diagram showing an exemplary display screen of a user terminal according to the third embodiment.

The flowchart of FIG. 12 shows how the operations of the content distribution server 10 and the user terminal 20 are related to each other. Although FIGS. 12 and 13 show the first object corresponding to the first user viewing the content and the third object as the lecturer avatar are arranged in the virtual space, these objects may not be arranged.

Since the operations of step S1211 through step S1215, and step S1222 are the same as those of step S611 through step S615, and step S622 in the first embodiment, the description thereof will not be repeated.

In step S1216, the content distribution server 10 arranges, in the virtual space, a second object corresponding to a second user having viewed the lecture data in the past, at a position of predetermined coordinates according to the attribute of the second user. Specifically, a specific object corresponding to a second user friend-registered with the first user or corresponding to a second user satisfying a predetermined notability condition is arranged within a predetermined distance from the position of the virtual viewpoint of the first user.

For example, as shown in FIG. 13, an object F2 corresponding to the second user friend-registered with the first user is arranged closer to an object A1 corresponding to the first user, as compared to an object A2 corresponding to a second user not friend-registered with the first user.

In step S1217, the content distribution server 10 transmits the lecture data and the distribution control information to the user terminal 20. The distribution control information includes virtual space information, reproduction position information of the lecture data, and arrangement control information of first, second, and third objects.

Since the operation of step S1228 is the same as that of step S628 in the first embodiment, the description thereof will not be repeated.

<4 Effects>

As described above, with the content distribution system 1 according to the third embodiment of the present disclosure, when the first user views content in the virtual space, the second object corresponding to the second user having viewed the content is arranged in a predetermined position in the virtual space. Therefore, the system causes the first user to feel as if he/she is viewing the content together with the second user, and achieves a higher sense of reality. Further, according to the attribute of the second user, a specific object corresponding to a second user friend-registered with the first user or corresponding to a second user satisfying a predetermined notability condition is arranged within a predetermined distance from the position of the virtual viewpoint of the first user. This induces two-way communication between the first user and the second user.

These embodiments may be implemented in a variety of other forms, and various omissions, substitutions, and modifications may be made without departing from the spirit of the invention. These embodiments and variations thereof shall be encompassed within the scope of the invention as set forth in the claims as well as equivalent thereof, as in the case of encompassing the same within the scope and spirit of the invention.

<Variation>

(1) The above-described embodiments each deal with a case where an avatar of another user is arranged at a position around the position of the virtual viewpoint of the first user, which position does not block the first user from viewing the lecture data. The avatar of the other user is operated by motion data or the audio data input while the other user was viewing the lecture data.

Here, regarding the avatar arranged around the virtual viewpoint of the first user, it is possible to specify a user whose motion data or audio data for activating the avatar meets a predetermined condition, and operate the avatar based on the motion data or the audio data of that specified user. For example, a user with a certain level or more of speaking volume of the audio data or with a certain frequency of speaking up may be specified, and the avatar around the virtual viewpoint of the first user may be operated with the audio data or the motion data of that specified user.

This, for example, allows the user to feel as if he/she is taking a lecture with a user who frequently speaks up or move.

(2) In each of the above-described embodiments, the lecture data may include a first part in which a lecture progresses through interaction between a lecturer object and a user viewing the lecture, and a second part in which the lecture progresses through interaction among users viewing the lecture. For example, in the first part, the lecturer object speaks or moves and the user viewing the lecture speaks or moves in response to the speech or the movement of the lecturer object. For example, in a case of practicing conversation in an English lecture, the lecturer object can take one role of the conversation and the user viewing the lecture can take the other role of the conversation.

In the second part, on the other hand, the conversation script used in the first part may be practiced between users. For example, the conversation is practiced between the first user and an object corresponding to the second user having viewed the lecture in the past. In this case, the audio of the second user generated in the second part may be the audio of the second user taken during the conversation practice with the lecturer object in the first part.

Further, the lecturer object may be operated based on the motion data or the audio data of a user viewing the lecture data.

(3) The above-described embodiments each deal with a case where the virtual space providing module 1033, the virtual viewpoint setting module 1034, and the object arrangement module 1035 are arranged in the content distribution server. However, all or some of these modules may be arranged in the user terminal.

The effects of each of the above-described embodiments are achievable with such an arrangement, and content stored in the server does not have to be overwritten every time the user views the content. Therefore, this arrangement maintains the versatility, and allows operation with a reduced amount of maintenance.

(4) In each of the above-described embodiments, content may include, in advance, a predetermined object (e.g., avatar) and the arrangement position of the object in the virtual space may be associated with the content, irrespective of whether or not the user viewed the content in the past. That is, even in a case where any one of the plurality of users views the content for the first time, the user can view the content with the predetermined object (avatar) arranged at the arrangement position. Here, in each embodiment, when the user views the content, the predetermined object associated with the content from the beginning may be arranged in another place regardless of the arrangement place defined in advance.

<Supplementary Notes>

The matters described in each of the above embodiments are additionally described below.

(Supplementary Note 1)

A program executable in a computer for viewing content, the computer including a processor and a memory, wherein the program causes the processor to execute a first step (S613, S615) of generating a virtual space in response to an operation by a first user to designate content and setting a virtual viewpoint corresponding to the first user in the virtual space, a second step (S614) of starting reproduction of the content designated in the virtual space, and a third step (S616) of arranging, in the virtual space, at least one of an object pre-associated with the content or a second object corresponding to a second user who has viewed the content in the past; and when the first user views the content, the object pre-associated or the second object is arranged in the third step (S616) at a position not related to a position of the virtual viewpoint of the second user in the virtual space or a position of the object pre-associated at the time when the second user viewed the content.

(Supplementary Note 2)

The program of (Supplementary Note 1), wherein in the first step (S613, S615), the virtual viewpoint of the first user is set, based on an arrangement position of an object to be viewed by the first user in the virtual space; and in the third step (S616), the second object is arranged at a position different from a predetermined range including the virtual viewpoint of the first user.

(Supplementary Note 3)

The program of (Supplementary Note 2), wherein in the first step (S613, S615), the predetermined range is defined by the virtual viewpoint of the first user and a position where the content is reproduced.

(Supplementary Note 4)

The program of any one of (Supplementary Note 1) to (Supplementary Note 3), wherein the content is educational content; the program causes the processor to further execute a fourth step (S614) of arranging, in the virtual space, a third object that presents the educational content to the first user; and in the first step (S613, S615), the virtual viewpoint of the first user is set based on the position where the third object is arranged in the virtual space.

(Supplementary Note 5)

The program of (Supplementary Note 4), wherein the third object is an avatar object that gives a lesson in the educational content; in the second step (S914), the content is reproduced in the virtual space by operating the avatar object based on at least one of motion data or audio data; the program causes the processor to further execute a fifth step (S916) of recording at least one of motion data or audio data input by the first user, in response to reproduction of the educational content or an action of the avatar object; and a result of the input by the first user, which inputs is recorded, is data to be read out when another user of another computer views the content.

(Supplementary Note 6)

The program of (Supplementary Note 5), wherein the program causes the processor to further execute a sixth step (S916) of activating the second object based on an input by the second user recorded when the second user viewed the content.

(Supplementary Note 7)

The program of (Supplementary Note 5) or (Supplementary Note 6), wherein in the second step (S914), at least one of motion data or audio data the second user has input in response to the action of the avatar object is read out, and the avatar object is operated based on at least one of the motion data or the audio data of the second user.

(Supplementary Note 8)

The program of (Supplementary Note 7), wherein the educational content includes a first part configured by interaction between a user in a lecturer role giving the lesson and a user in a viewer role viewing the educational content and a second part configured by interaction among users each of whom in the viewer role; when the first user views the second part, the second object is operated in the second step (S914), based on at least one of the motion data or audio data of the second user in response to the first user inputting at least one of motion data or audio data; and at least one of motion data or the audio data of the second user to operate the second object in the second part is motion data or audio data recorded when the second user interacted with the user in the lecturer role in the first part.

(Supplementary Note 9)

The program of (Supplementary Note 6), wherein in the third step (S916), a user whose motion data or audio data satisfies a predetermined condition is specified out of users having viewed the content in the past, and a specific object corresponding to the user specified is arranged within a predetermined distance from the position of the virtual viewpoint of the first user; and in the sixth step (S916), the specific object is operated based on at least one of motion data or audio data of the user.

(Supplementary Note 10)

The program of (Supplementary Note 6), wherein in the third step (S1216), a friend-registered user or a user whose notability satisfies a predetermined condition is specified out of users having viewed the content in the past, and a specific object corresponding to the user specified is arranged within a predetermined distance from the position of the virtual viewpoint of the first user.

(Supplementary Note 11)

The program of (Supplementary Note 10), wherein the first object corresponding to the first user is arranged based on the position of the virtual viewpoint of the first user.

(Supplementary Note 12)

The program of any one of (Supplementary Note 1) to (Supplementary Note 11), wherein the object pre-associated with the content is arranged in the virtual space, based on the position of the virtual viewpoint of the first user.

(Supplementary Note 13)

An information processing device used for viewing content, the information processing device including a controller and a storage, wherein the controller causes execution of a first step (S613, S615) of generating a virtual space in response to an operation by a first user to designate content and setting a virtual viewpoint corresponding to the first user in the virtual space, a second step (S614) of starting reproduction of the content designated in the virtual space, and a third step (S616) of arranging, in the virtual space, a second object corresponding to a second user who has viewed the content in the past; and when the first user views the content, the second object is arranged in the third step (S616) at a position not related to a position of the virtual viewpoint of the second user in the virtual space at the time when the second user viewed the content.

(Supplementary Note 14)

A method implemented in a computer for viewing content, the computer including a processor and a memory, the method including causing the processor to execute: a first step (S613, S615) of generating a virtual space in response to an operation by a first user to designate content and setting a virtual viewpoint corresponding to the first user in the virtual space; a second step (S614) of starting reproduction of the content designated in the virtual space; and a third step (S616) of arranging, in the virtual space, a second object corresponding to a second user who has viewed the content in the past, wherein when the first user views the content, the second object is arranged in the third step (S616) at a position not related to a position of the virtual viewpoint of the second user in the virtual space at the time when the second user viewed the content.

DESCRIPTION OF REFERENCE CHARACTERS

1 Content Distribution System
10 Content Distribution Server
101 Communication Unit
102 Storage
103 Controller
User Terminal
201 Memory
202 Storage
203 Processor
204 Communication Unit
205 Detector
206 Input Unit
207 Display

The invention claimed is:

1. A non-transitory computer readable medium comprising a program stored thereon, that when executed by a processor, causes the processor to execute:
   generating a virtual space in response to an operation by a first user to designate content;
   setting a first virtual viewpoint corresponding to the first user in the virtual space;
   reproducing the designated content in the virtual space;
   arranging in the virtual space a first object corresponding to the first user who views the content, based on a position of the first virtual viewpoint; and
   arranging in the virtual space at least one of a content-associated object that is pre-associated with the content or a second object corresponding to a second user who viewed the content in the past, at a position irrelevant to either a previous position of a second virtual viewpoint corresponding to the second user in the virtual space or a previous position of the content-associated object in the virtual space, wherein the previous position of the second virtual viewpoint or the previous position of the content-associated object is a position thereof at a time when the second user viewed the content in the past.

2. The non-transitory computer readable medium of claim 1, wherein setting the first virtual viewpoint comprises setting the first virtual viewpoint based on an arrangement position of an object to be viewed by the first user in the virtual space, and
   wherein arranging at least one of the content-associated object or the second object comprises arranging the second object at a position outside a predetermined range including the position of the first virtual viewpoint in the virtual space.

3. The non-transitory computer readable medium of claim 2, wherein the predetermined range includes the position of the first virtual viewpoint and a reproduction position where the content is reproduced in the virtual space.

4. The non-transitory computer readable medium of claim 1, wherein the content includes educational content,
   wherein the program causes the processor to further execute arranging in the virtual space a third object that is configured to present at least the educational content to the first user, and
   wherein setting the first virtual viewpoint comprises setting the first virtual viewpoint based on a position where the third object is arranged in the virtual space.

5. The non-transitory computer readable medium of claim 4, wherein the third object includes an avatar object that is configured to give a lesson in the educational content,
   wherein reproducing the designated content comprises operating the third object to cause an action of the third object in the virtual space,
   wherein the program causes the processor to further execute recording at least one of first motion data or first audio data input by the first user in response to reproduction of the content or the action of the third object such that at least one of the recorded first motion data or the recorded first audio data can be used by a computer of another user.

6. The non-transitory computer readable medium of claim 5, wherein the program causes the processor to further execute operating the second object in the virtual space based on at least one of recorded second motion data or recorded second audio data, at least one of the recorded second motion data or the recorded second audio data input by the second user and recorded when the second user viewed the content in the past.

7. The non-transitory computer readable medium of claim 5, wherein reproducing the designated content comprises:
operating the third object in the virtual space based on at least one of recorded second motion data or recorded second audio data, at least one of the recorded second motion data or the recorded second audio data input by the second user in response to the action of the third object and recorded when the second user viewed the content in the past.

8. The non-transitory computer readable medium of claim 7, wherein the educational content includes a first portion comprising interaction between the third object giving the lesson and a user in a viewer role viewing the educational content and a second portion comprising interaction among users each of whom is in the viewer role,
wherein reproducing the designated content comprises operating the second object in the virtual space based on at least one of the recorded second motion data or the recorded second audio data in response to input of at least one of the first motion data or the first audio data by the first user when the first user views the second portion of the educational content, and
wherein the at least one of the recorded second motion data or the recorded second audio data is motion data or audio data recorded when the second user interacted with the third object in the first portion in the past.

9. The non-transitory computer readable medium of claim 6, wherein arranging the content-associated object or the second object comprises:
specifying the second user out of a plurality of second users who viewed the content in the past, at least one of the recorded second motion data or the recorded second audio data of the specified second user satisfying a predetermined condition; and
arranging in the virtual space the second object corresponding to the specified second user within a predetermined distance from the position of the first virtual viewpoint, and
wherein operating the second object comprises operating the second object in the virtual space based on at least one of the recorded motion data or the recorded audio data of the specified second user.

10. The non-transitory computer readable medium of claim 6, wherein arranging the content-associated object or the second object comprises:
specifying the second user out of a plurality of second users who viewed the content in the past, the specified second user registered as a friend of the first user or notability of the specified second user satisfying a predetermined condition; and
arranging in the virtual space the second object corresponding to the specified second user within a predetermined distance from the position of the first virtual viewpoint.

11. The non-transitory computer readable medium of claim 1, wherein the content-associated object is arranged in the virtual space based on the position of the first virtual viewpoint.

12. An information processing device, comprising:
a controller; and
a storage,
wherein the controller is configured to:
generate a virtual space in response to an operation by a first user to designate content;
set a first virtual viewpoint corresponding to the first user in the virtual space;
reproduce the designated content in the virtual space;
arrange in the virtual space a first object corresponding to the first user who views the content, based on a position of the first virtual viewpoint; and
arrange in the virtual space at least one of a content-associated object that is pre-associated with the content or a second object corresponding to a second user who viewed the content in the past, at a position in the virtual space irrelevant to either a previous position of a second virtual viewpoint corresponding to the second user in the virtual space or a previous position of the content-associated object in the virtual space wherein the previous position of the second virtual viewpoint or the previous position of the content-associated object is a position thereof at a time when the second user viewed the content in the past.

13. The information processing device of claim 12, wherein the controller is configured to;
set the first virtual viewpoint based on an arrangement position of an object to be viewed by the first user in the virtual space; and
arrange the second object at a position outside a predetermined range including the position of the first virtual viewpoint in the virtual space.

14. The information processing device of claim 12, wherein the content includes educational content,
wherein the controller is further configured to:
arrange in the virtual space a third object that is configured to present at least the educational content to the first user; and
set the first virtual viewpoint based on a position of the third object in the virtual space.

15. The information processing device of claim 12, wherein the content-associated object is arranged in the virtual space based on the position of the first virtual viewpoint.

16. A method implemented in a computer comprising a processor and a memory, the method comprising:
generating a virtual space in response to an operation by a first user to designate content;
setting a first virtual viewpoint corresponding to the first user in the virtual space;
reproducing the designated content in the virtual space;
arranging in the virtual space a first object corresponding to the first user based on a position of the first virtual viewpoint; and
arranging in the virtual space at least one of a content-associated object that is pre-associated with the content or a second object corresponding to a second user who viewed the content in the past, at a position irrelevant to either a previous position of a second virtual viewpoint corresponding to the second user in the virtual space or a previous position of the content-associated object in the virtual space, wherein the previous position of the second virtual viewpoint or the previous position of the content-associated object is a position thereof at a time when the second user viewed the content in the past.

17. The method of claim 16, wherein setting the first virtual viewpoint comprises setting the first virtual viewpoint based on an arrangement position of an object to be viewed by the first user in the virtual space, and
wherein arranging at least one of the content-associated object or the second object comprises arranging the second object at a position outside a predetermined range including the position of the first virtual viewpoint in the virtual space.

18. The method of claim 16, wherein the content includes educational content,
wherein the method further comprises arranging in the virtual space a third object that is configured to present at least the educational content to the first user, and
wherein setting the first virtual viewpoint comprises setting the first virtual viewpoint based on a position where the third object is arranged in the virtual space.

19. The method of claim 16, wherein content-associated object is arranged in the virtual space based on the position of the first virtual viewpoint.

* * * * *